United States Patent
Alizadeh-Shabdiz et al.

(10) Patent No.: US 10,681,511 B1
(45) Date of Patent: Jun. 9, 2020

(54) TECHNIQUES FOR DETERMINING WHETHER A MOBILE DEVICE IS INSIDE OR OUTSIDE A ZONE OF A VENUE

(71) Applicant: Skyhook Wireless, Inc., Boston, MA (US)

(72) Inventors: Farshid Alizadeh-Shabdiz, Wayland, MA (US); Russel K. Jones, Roswell, GA (US); Javier Velez, Cambridge, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 15/803,409

(22) Filed: Nov. 3, 2017

(51) Int. Cl.
*H04W 24/00* (2009.01)
*H04W 4/30* (2018.01)
*G01S 5/02* (2010.01)
*H04W 4/02* (2018.01)
*H04W 4/029* (2018.01)

(52) U.S. Cl.
CPC ............. *H04W 4/30* (2018.02); *G01S 5/0278* (2013.01); *H04W 4/023* (2013.01); *H04W 4/029* (2018.02)

(58) Field of Classification Search
CPC ....... H04W 4/04; H04W 4/029; H04W 4/023; G01S 5/0278
USPC .............................................. 455/456.1–457
See application file for complete search history.

(56) References Cited

U.S. PATENT DOCUMENTS

| | | | |
|---|---|---|---|
| 7,433,694 B2 | 10/2008 | Morgan et al. | |
| 7,856,234 B2 | 12/2010 | Alizadeh-Shabdiz et al. | |
| 7,913,163 B1* | 3/2011 | Zunger | G06F 16/951 715/243 |
| 8,063,820 B2 | 11/2011 | Alizadeh-Shabdiz | |
| 8,229,455 B2 | 7/2012 | Alizadeh-Shabdiz | |
| 8,315,233 B2 | 11/2012 | Alizadeh-Shabdiz | |
| 8,908,664 B2 | 12/2014 | Caldwell et al. | |
| 8,989,779 B1* | 3/2015 | Centore, III | H04W 4/021 455/456.3 |
| 9,408,037 B1 | 8/2016 | Alizadeh-Shabdiz et al. | |
| 9,485,622 B2 | 11/2016 | Lin et al. | |
| 9,674,656 B2 | 6/2017 | Li et al. | |
| 9,935,348 B2 | 1/2018 | Yu et al. | |
| 2013/0260797 A1* | 10/2013 | Jones | H04W 4/02 455/456.3 |

(Continued)

*Primary Examiner* — Khoi H Tran
*Assistant Examiner* — B M M Hannan
(74) *Attorney, Agent, or Firm* — Cesari and McKenna, LLP; James A. Blanchette (57) ABSTRACT

In various embodiments, techniques are provided for determining one or more zones in which mobile devices are presently located and identifying or updating characteristics of on or more zones. Samples that include beacon information and/or sensor information collected by mobile devices are aggregated and dynamically organized into sample classes that are associated with zero, one or more zones. A venue is characterized by a set of zones and associated tags, which may be informed based on samples for the venue, a venue group to which the venue belongs, or all venues. To determine if a mobile device is located in one or more zones, the samples are compared to zone characteristics, and based thereon (and optionally history information) one or more zones are selected having determined likelihoods, and at least a zone having the highest likelihood of the one or more selected zones is returned.

22 Claims, 9 Drawing Sheets

(56) References Cited

U.S. PATENT DOCUMENTS

| | | | |
|---|---|---|---|
| 2013/0344888 A1* | 12/2013 | Dousse | H04W 4/025 455/456.1 |
| 2015/0245175 A1 | 8/2015 | Alizadeh-Shabdiz | |
| 2016/0300263 A1* | 10/2016 | Priness | G06Q 30/0261 |
| 2016/0323717 A1* | 11/2016 | Friday | H04W 4/043 |
| 2017/0052960 A1 | 2/2017 | Alizadeh-Shabdiz | |
| 2017/0295459 A1* | 10/2017 | Kim | G01S 1/68 |
| 2017/0301160 A1* | 10/2017 | Somani | G07C 9/00079 |
| 2018/0046825 A1* | 2/2018 | Kou | G06F 21/6245 |
| 2019/0012699 A1* | 1/2019 | Sweeney | H04W 76/10 |

\* cited by examiner

| VENUE ID | ZONE ID | LIKELIHOOD | MEASUREMENTS | HISTORY |
|---|---|---|---|---|
| ID1 | X | L1 | {m1, ...} | {( Vl, Z1, T1), ..., (Vn, Zn, Tn)} |
| ID2 | Y | L2 | {m2, ...} | {( Vl, Z1, T1), ..., (Vk, Zk, Tk)} |
| ⋮ | ⋮ | ⋮ | ⋮ | ⋮ |
| IDn | Z | Ln | {mn, ...} | {( Vl, Z1, T1), ..., (Vp, Zp, Tp)} |

FIG. 9

TECHNIQUES FOR DETERMINING WHETHER A MOBILE DEVICE IS INSIDE OR OUTSIDE A ZONE OF A VENUE

BACKGROUND

Technical Field

The present disclosure relates generally to location-based services, and more specifically to techniques for determining one or more zones in which mobile devices are presently located and identifying or updating characteristics of one or more zones.

Background Information

Location-based services are becoming increasingly important to businesses and consumers. Often, to provide location-based services, a positioning system determines a geographic location of a mobile device by comparing information in wireless signals observed by the mobile device to a database of information concerning known beacons. The determined geographic location may then be used to access information describing venues maintained in a separate database. Such an arrangement may have a number of shortcomings. For example, it may require that a specific geographic location be determined by a mobile device before any information concerning venues nearby the mobile device may be accessed. Determining a specific geographic location may consume processing, memory and other device resources. Further, while a determined geographic location may be sufficiently precise for some uses, it may not be precise enough to determine a specific sub-portion or region of a venue that the mobile device may be located in. For example, a specific geographic location may not be precise enough to determine a mobile device is located in a checkout area, a gardening merchandise area, a parking area, etc. of a retail store, as opposed to elsewhere in the retail store, or in another nearby retail store. Accordingly, there is a need for improved techniques that can address these and/or other shortcomings.

SUMMARY

In various embodiments, techniques are provided for one or more determining zones in which mobile devices are presently located and identifying or updating characteristics of one or more zones. Samples that include beacon information and/or sensor information collected mobile devices are aggregated. The aggregated samples are dynamically organized into sample classes that are associated with zero, one or more zones. A venue is characterized by a set of zones and associated tags, which may be informed based on samples for the venue, a venue group to which the venue belongs, or all venues. A closed feedback loop may be employed such that as more samples are collected improved sample classes may be identified, improved associations of sample classes to zones may be made, additional or different zones may be generated, improved zone and venue characterization made, improved venue groups defined, etc. with a quality of estimate serving as a guide. To determine if a mobile device is located in a zone, the samples are compared at least to zone characteristics, and based thereon (and optionally history information) one or more zones are selected having determined likelihoods. A zone having the highest likelihood is returned.

In one embodiment, a technique is provided for determining one or more zones in which mobile devices are presently located and identifying or updating characteristics of one or more zones. A server receives requests from a plurality of mobile devices. At least some of the requests contain samples that include beacon information and/or sensor information observed by sensors of the mobile devices. The server returns to each of the mobile devices at least one of zone characteristics (to enable the mobile device to determine a zone in which the mobile device is presently located), or a determined zone that the server itself computes. The server further identifies or updates characteristics of one or more zones maintained at the server based on the received samples by identifying sample classes that each include a set of samples that share common sample characteristics, associating each sample class with zero, one or more zones according to one or more association algorithms, and based on the newly associated sample classes, identifying at least one new sample class, associating sample classes with one or more different zones, or determining one or more different zones. The server repeats the identifying or updating in a closed feedback loop as more samples are received.

In another embodiment, a technique is provided for determining one or more zones in which a mobile device is presently located. A client on the mobile device receives a request from an application (e.g., a location based service (LBS) application). The request may be for a venue of a zone that the mobile device is presently located in. The mobile device collects including at least beacon and/or sensor information observed by one or more sensors of the mobile device. Based thereon, the client (or a server in communication with the client) accesses zone characteristics of one or more zones that the mobile device may be located in, and compares measurements in the collected samples to the zone characteristics to select one or more zones and determine a likelihood that the mobile device is located therein. The client returns at least a zone of the one or more selected zones having a highest likelihood to the application.

It should be understood that the example embodiment discussed in this Summary may include a variety of other features, including other features discussed below, and variations thereof. Further a variety of other embodiments may be utilized involving various combinations of the features discussed below and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings, of which.

DETAILED DESCRIPTION

Definitions

As used herein, the term "mobile device" refers to an electronic device adapted to be transported. Examples of mobile devices include smartphones, tablet computers, and smartwatches, among other readily transportable electronic devices.

As used herein, the term "beacon" refers to a wireless module that can be identified uniquely. A beacon emits wireless signals (e.g., radio waves) and beacon information can be derived from the detection of these wireless signals. A beacon can have a fixed geographic location, or can be mobile. Examples of beacons include Wi-Fi access point (APs), Bluetooth or Bluetooth Low Energy (BLE) devices (Android® beacons, iBeacon® beacons, etc.), cellular base stations, and the like.

As used herein, the term "beacon information" refers to a set of information describing properties or qualities of a beacon. Examples of beacon information include assigned identifiers of beacons (Wi-Fi AP media access control (MAC) address, service set identifier (SSID) etc., cell base station unique ID, Bluetooth or BLE unique IDs, satellite ID/pseudo random noise (PRN) code, etc.) and received signal strength (RSSI) of various wireless signals (e.g., Wi-Fi, BLE, cellular, satellite, etc.). Beacon information may be extracted directly from the wireless signals, or determined after processing of the wireless signals (e.g., involving communication with a positioning system separate from the beacon).

As used herein, the term "venue" refers to a place with a semantically describable identity and a definable geography. Examples of venues include retail stores, restaurants, museums, etc. that encompass an entire building, part of a building, multiple buildings, outdoor space or other area.

As used herein, the term "venue group" refers to a set of venues that share common venue characteristics. An example of a venue group is a "venue chain", which refers to a set of commonly owned or operated venues (e.g., a chain of retail stores) that share common venue characteristics.

As used herein, the term "zone" refers to a region of space and/or time relative to a venue, with a semantically describable identity. A zone may be defined in reference to a footprint or other boundaries (e.g., an "inside" zone, an "outside" or "not-inside" zone, an "office" zone, a "conference room" zone, etc.), in reference to utility (e.g., a "cashier" zone, a "parking" zone, etc.), in reference to time periods (e.g., a "night" zone, a "day" zone, etc.), and combinations thereof (e.g., an "outside-day" zone, an "outside-night" zone, etc.), among other possibilities. In some embodiments, a zone may be a venue, a portion of a venue, or either thereof during a particular time period (e.g., open hours).

As user herein, the term "tag" refers to a sematic label that conveys information about a zone's intention, utility or other properties. Examples of tags include an "inside" tag, an "outside" tag, a "cashier" tag, a "parking" tag, etc.

As used herein, the term "sensor information" refers to a set of information describing conditions external to a mobile device that are observed or measured by one or more sensors of the mobile device. Sensor information may include information about light, magnetic field, pressure, sound, orientation, motion/speed, type of motion, chemical composition, user fingerprints, received signal strength of wireless signals from other sources (e.g., satellite positioning system signals), or information about other types of external observable or measurable conditions.

As used herein, the term "sample" refers to an observation by a mobile device that includes at least beacon and/or sensor information. A sample may include a plurality of individual measurements collected at a given time.

As used herein the term "characteristic" refers to a summary and/or derivation of a set of samples. Characteristics may be associates with specific entities. For example "sample characteristics" are characteristics associated with samples, "class characteristics" are characteristics associated with sample classes, "zone characteristics" are characteristics associated with zones, etc. Entities may be said to share characteristics when they both contributed to or otherwise are associated with at least one characteristic.

As used herein, the term "sample class" refers to a set of samples that share common sample characteristics. Samples may be grouped into sample classes based on one, or a combination, of criteria.

As used herein, the term "tile" refers to a geographically-bounded set of information. One type of tile is a "venue tile" which, as used herein, refers to a tile that includes venue information (i.e. information about venues and zones thereof) for a geographically bounded area.

As used herein the term "natural compliments" refers to member of a set of two or more properties that are defined by physics of the natural world (e.g., the physics of space and time), and that are required to exist in a physical system of a given type. For example, any enclosed physical system necessarily has an "inside" and a "not-inside" or "outside", which are natural compliments.

EXAMPLE EMBODIMENTS

Figure 1:
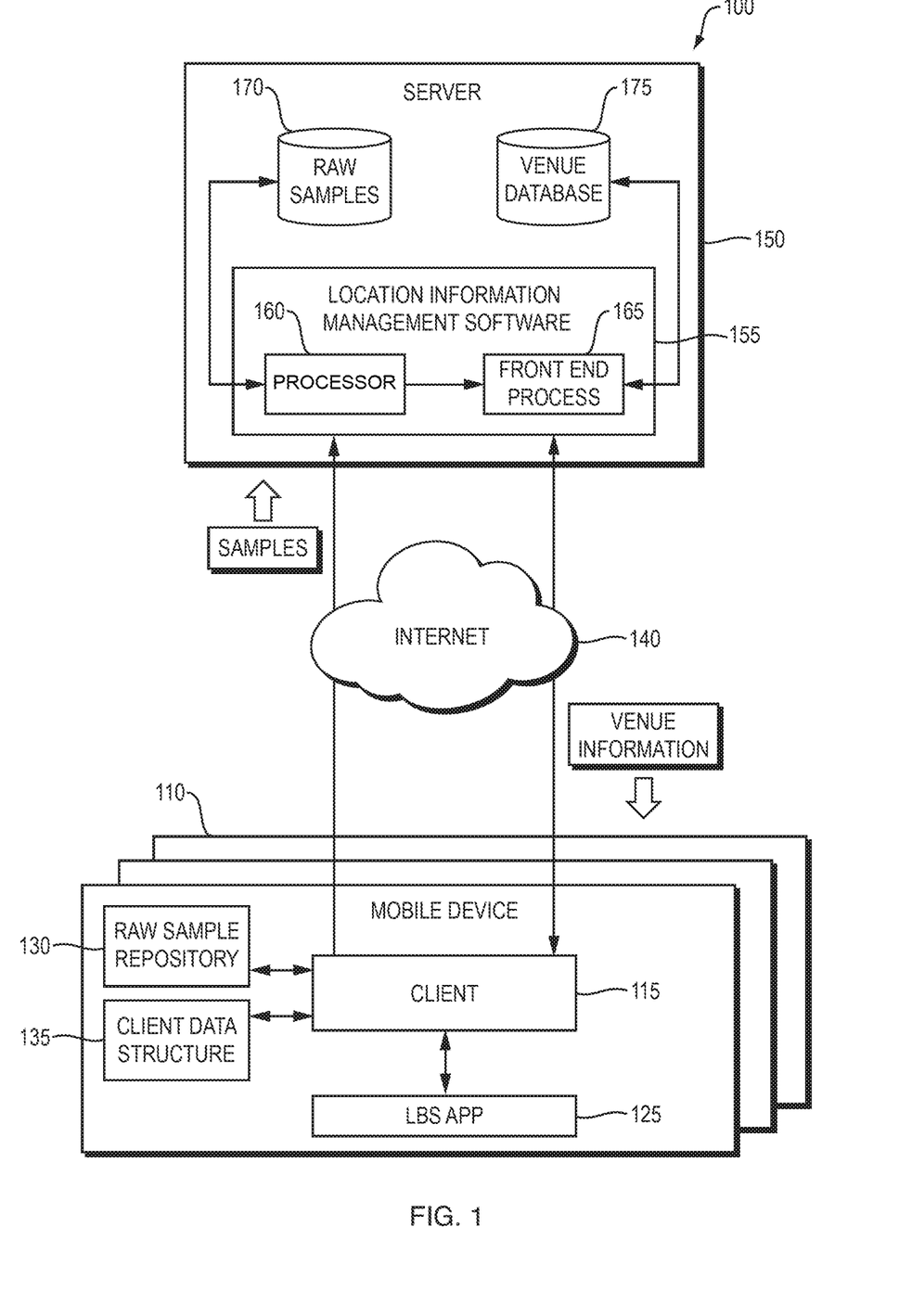
FIG. 1 is a block diagram of an example system for characterizing venues and zones thereof and determining if a mobile device is located in a zone of a venue.

FIG. 1 is a block diagram of an example system 100 for characterizing venues and zones thereof, and determining if a mobile device is located in a zone of a venue. The example system includes mobile devices 110 (e.g., smartphones, tablet computers, etc.) that each have at least a processor, a memory storing software and data, and one or more sensors for capturing the observable or measurable environment (e.g., a wireless interface, such as a Wi-Fi, BLE, cellular, satellite positioning system, etc. interface for capturing a received signal strength indication (RSSI) of the respective type of wireless signal, a light sensor for capturing ambient light level, a manometer for detecting magnetic field strength, etc.). The software may include an operating system (not shown), a client 115 configured to assist in characterizing venues and determining if the mobile device 110 is located in one or more venues and zones, and one or more location based service (LBS) applications (apps) 125 that request and consume the one or more determined venues and zones thereof. The data may include a raw sample repository 130 that stores samples that include beacon information and/or sensor information captured by the sensors and awaiting processing, and a client data structure 135 that maintains information regarding determined venues, zones, and likelihoods, samples associated therewith, and, optionally, history information.

The mobile devices 110 communicate over the Internet 140 with a server 150 that at least has a processor and a memory storing software. The software may include location information management software 155 that has a processor 160 that receives and processes samples 130 from clients 115 to produce venue information characterizing venues and zones thereof, and a front-end process 165 that provides venue information (e.g., as venue tiles) to clients 115. The data may include a raw sample database 170 that stores samples captured by the mobile devices 110 awaiting processing, and a venue database 175 that stores the venue information characterizing venues and zones thereof awaiting to be served to clients 115.

If should be understood that software executing on certain devices in the example system 100 may, alternatively, be executed fully or partially on other electronic devices, such that at least some operations of the client 115 on the mobile device 110 may be instead executed on the server 150, at least some operations of the processor 160 and front-end process 165 may be instead executed in the client 115 on the mobile device 110, among other possible configurations.

Figure 2:
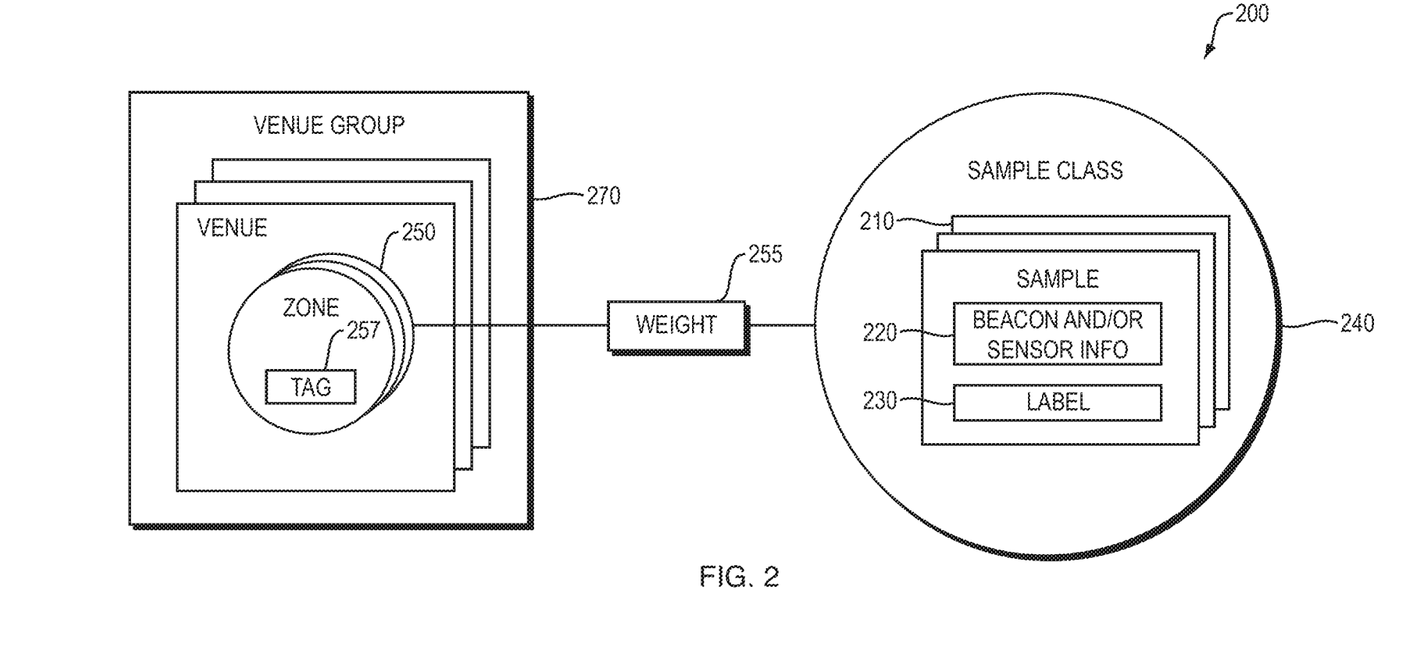
FIG. 2 is a diagram illustrating data relations that may be formed by the processor in order to generate and characterize venues and zones thereof.
Figure 3:
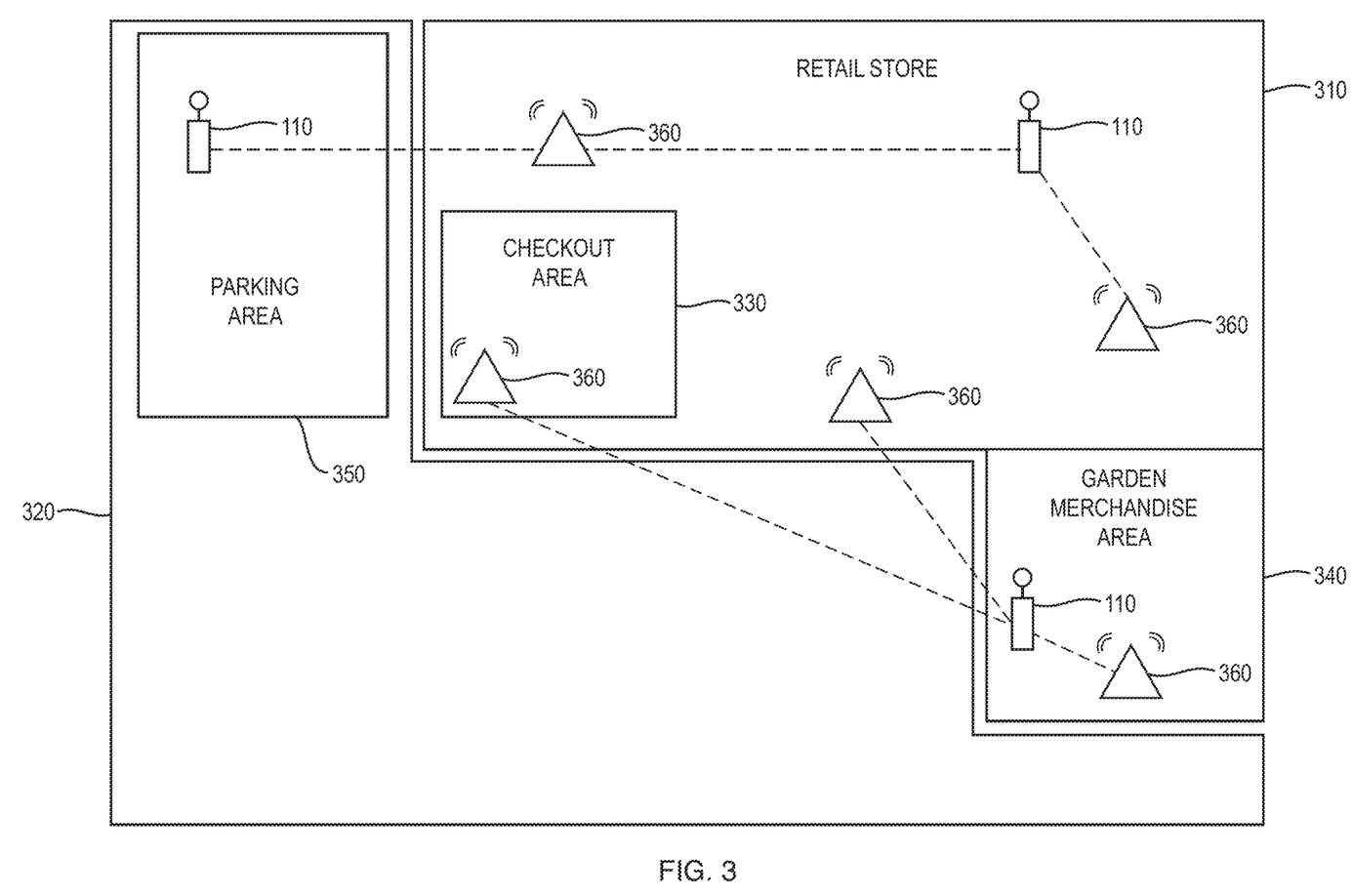
FIG. 3 is a schematic diagram of an example retail store that illustrates collection of samples.

In operation, samples that include beacon information and/or sensor information (e.g., comprising multiple individual measurements) are collected by clients 115, and aggregated and processed to generate and characterize venues and zones thereof. FIG. 2 is a diagram 200 illustrating data relations that may be formed by the processor 160 in order to generate and characterize venues and zones thereof. Initially, mobile devices 110 collect samples 210. FIG. 3 is a schematic diagram of an example retail store 300 that illustrates collection of samples. The retail store may include spatial regions, such as inside the retail store 310, outside the retail store 320, a checkout area 330, a gardening merchandise area 340, a parking area 350, etc. as well as time regions, such as open hours/daytime (not shown), closed hours/nighttime (not shown), etc. A number of beacons 360 (e.g., Wi-Fi APs, Bluetooth or BLE devices, cellular base stations, and the like), owned and operated by the retail store or third parties, may provide wireless signals to mobile devices 110 executing the client 115. The mobile devices 110 observe the surrounding environment to measure received signal strength of various wireless, light, magnetic field, pressure, sound, orientation, motion/speed, type of motion, or other information about other types of observable conditions. The client 115 collects samples that each include at least beacon and/or sensor information 220 comprising one or multiple individual measurements. For example, each sample may include beacon information, such as one or more Wi-Fi AP MAC addresses, one or more Wi-Fi AP SSIDs, one or more Wi-Fi AP RSSIs, one or more cell base station unique ID, one or more Bluetooth or BLE unique IDs, one or more Bluetooth or BLE RSSIs, other types of beacon unique IDs and RSSIs, etc. Further, for example, each sample may include sensor information such as lighting level, time of data, RSSI of wireless signals from other sources (e.g., a satellite positioning system signal), device motion (e.g., stationary or moving), type of motion (e.g., walking, in transit by car, etc.) Still further each sample may include other types of information determined by processing the beacon information and/or sensor information 220, or from other sources, such as a location estimate of the mobile device 110 (e.g., determined using a Wi-Fi positioning system (WPS), cellular positioning system, satellite position system, hybrid thereof, etc.), a list of active apps on the mobile device 110, name of the LBA app 125 requesting request determined venues and zones, a determined venue (e.g., from execution of the client process 115 using already existing venue information), activity/inactivity of the mobile device 110 at the time of observation, type/model of the mobile device 110, operating system of the mobile device 110, etc.

In some cases, a semantic label 230 may be assigned to a sample. For example, referring to FIG. 4, a sematic label of "outside", "cashier", "garden", etc. may be assigned to certain samples. The semantic label may be based directly on the beacon information and/or sensor information 220, or from execution of the client process 115 using already existing venue information. For example, a semantic label of "outside" may be assumed for a sample with sensor information indicating a high rate of speed (e.g., indicative of driving) or observed at a time outside of normal open business hours. Likewise, in another example, a semantic label of a retail store name, or indicating utility of a portion of the retail store (e.g., "cashier") may be determined by execution of the client process 115 using already existing venue information.

Figure 4:
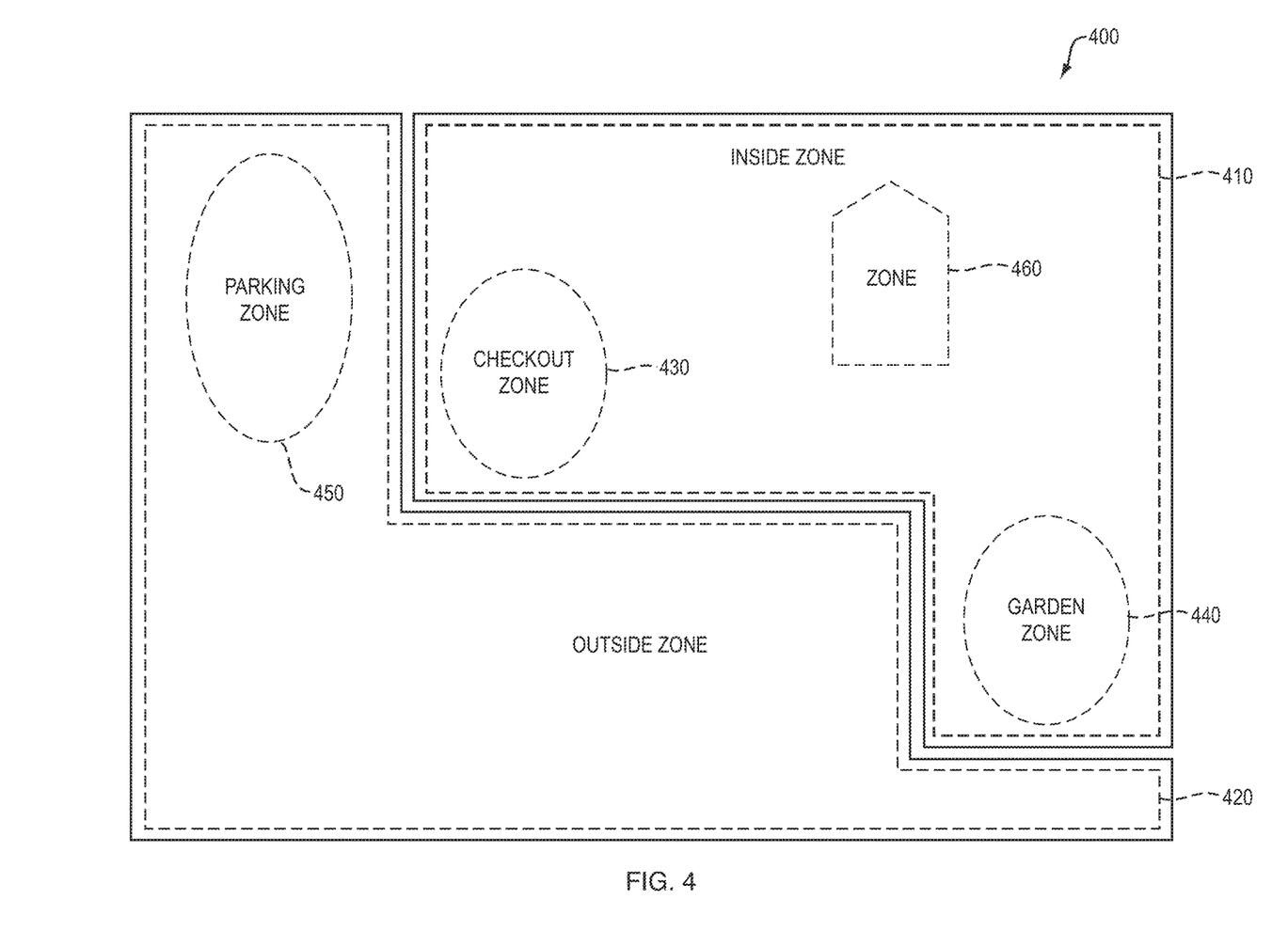
FIG. 4 is a schematic diagram of an example venue that may be generated for the example retail store of FIG. 3, which includes a number of zones.

Samples are utilized to determine and characterize venues having semantically describable identity and a definable geography, and zones that represent a region of space and/or time relative to a venue with a semantically describable identity. FIG. 4 is a schematic diagram of an example venue 400 that may be generated for the example retail store 300 of FIG. 3, which includes a number of zones 410-460. A zone 410 with an "inside" tag corresponds to the inside the retail store 310, a zone 420 with an "outside" tag corresponds to outside the retail store 320, a zone 430 with a "checkout" tag corresponds to the checkout area 330, a zone 440 with a "garden" tag corresponds to the gardening merchandise area 340, a zone 450 with a "parking" tag corresponds to the parking area 350, etc. Some zones, such as zone 460, may have no tag. The spatial extent of the venue and the space-time extent of zones may approximate, but not exactly match, those of the corresponding retail store and regions thereof.

Samples may be dynamically organized by the processor 160 into sets (i.e. sample classes) 240 that share common sample characteristics. Such organization may involve identifying axes of space-time, and identifying groups of samples along each axis. The sample characteristics may include the beacon and/or sensor information 220 of the samples, other types of information included in the samples, statistics derived from the information in the samples (referred to as "derived characteristics"), and any semantic labels 230 assigned to the samples, among other types of information. The identification of groups may consider a number of different criteria. The criteria may include a measure of similarity (distance) between the samples and their sample characteristics, a measure of goodness of a group of samples to characterize a particular zone, a measure of similarity (distance) of samples to another sample class based on characteristics of the other sample class (refereed to as "class characteristics"), a number of classes determined to exist, among other criteria. In some cases, the criteria and the sample characteristics considered in forming sample classes may be informed by existing associations with venues and zones. For example, the criteria and the sample characteristics may be informed by an existing association with a zone and tag of an associated venue, or a group of venues to which the associated venue belongs, or all venues.

The number of sample classes to be formed may be known or unknown prior to the grouping, based on the samples 210 themselves or existing associations. In some cases, the number of sample classes may be informed by numbers of zones of venues. For example, the number of sample classes may be informed by a number of zones expected for an already associated venue, or by a number of zones or sample classes of other venues of a group of venues to which the associated venue belongs. The number of sample classes may further be informed by known relationships (e.g., if there is an inside it can be inferred there must be a complement, a not-inside or outside). The number of sample classes may be dynamically changed (e.g., increased) over time, in response to collection of more samples and/or in response to dynamic changes in zones and zone characteristics over time, as discussed below.

Figure 5:
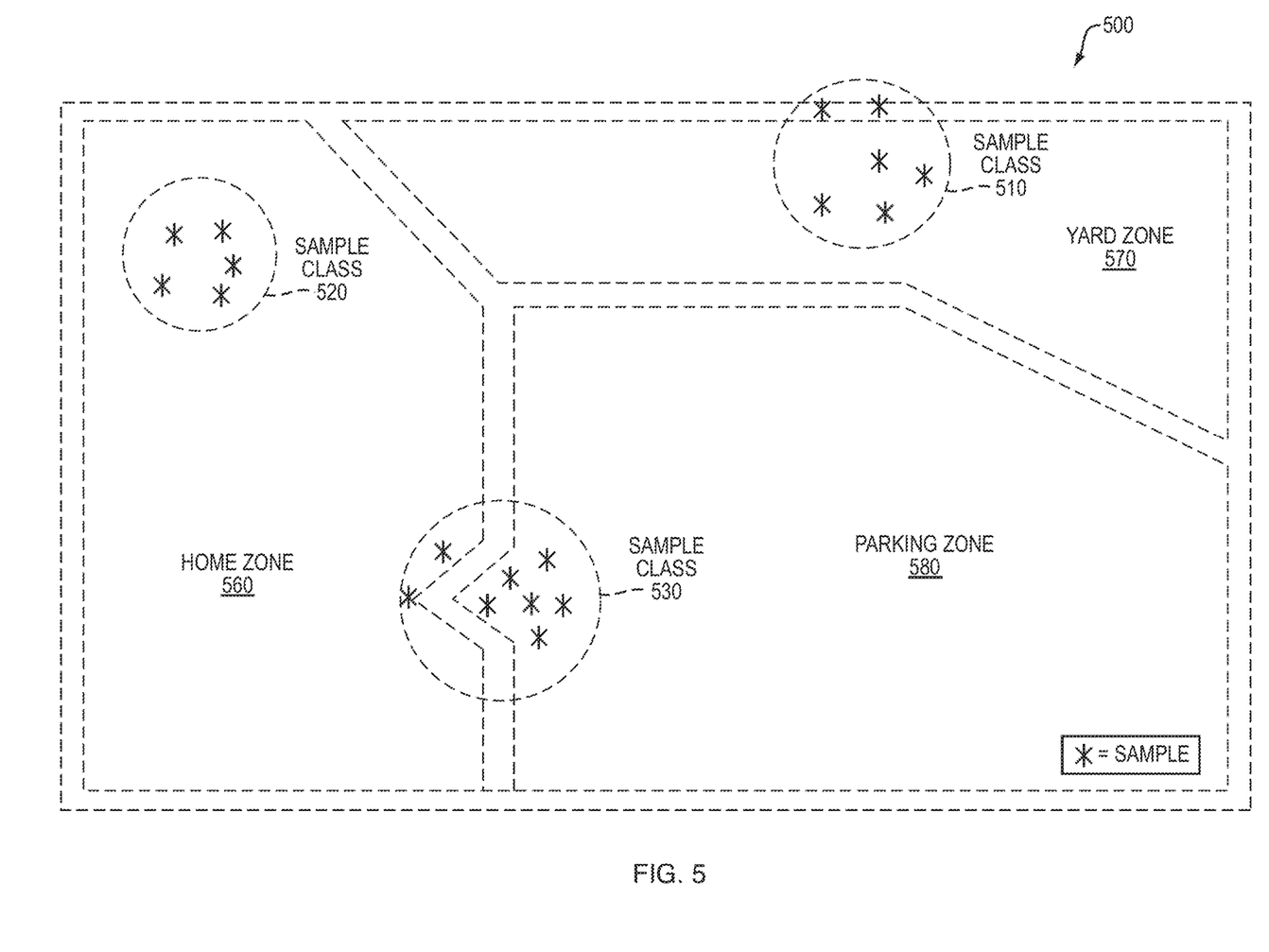
FIG. 5 is a schematic diagram illustrating example sample classes that may be generated from samples captured about a home.

Each sample class is associated with zero, one or more zones 250 with a weight 255 quantifying a strength of association. Each zone 250 may have one or more sample classes 240 associated with it. FIG. 5 is a schematic diagram illustrating example sample classes 510-530 that may be generated from samples captured about a home. The home may correspond to a "home" venue 500 that includes a number of zones, including a zone 540 with an "inside" tag, a zone 550 with an "outside" tag, a zone 560 with a "home" tag, a zone 570 with a "yard" tag, and a zone 580 with a "parking" tag. A sample class 510 may be associated with both the zone 550 and the zone 570, a sample class 520 may be associated with both the zone 540 and the zone 560, and the sample class 530 may be associated with the zone 580 and the outside zone 550. It should be understood, as shown for at least sample class 530 in FIG. 5, all samples of a sample class need to fall within a given zone for there to be an association.

Once a set of samples 210 have been grouped into sample classes 230, each sample class 230 is characterized to produce class characteristics. The class characteristics may be based on the information and/or sensor information of the class's constituent samples, derived characteristics determined from the sample characteristics of the samples, any zone of a venue for which there may be an existing association with the sample class, any other sample classes that have existing associations with the associated zone, any sample classes associated with zones of a zone group of the associated zone, among other characterization techniques. Class characteristics may be dynamically changed over time, in response to collection of more samples with beacon information and/or sensor information and/or in response to dynamic changes in zones over time, as discussed below.

A venue 260 is characterized by a set of zones 250 and associated tags 257, among other factors. A zone 250 is characterized based on associated sample classes 240 and their samples 210, among other factors. The processor 160 may utilize a number of association algorithms to dynamically associate sample classes 240 with zones 250. The association algorithms may utilize semantic similarities between labels of samples of the sample classes and tags of zones, similarity (distance) of class characteristics of sample classes to zone characteristics of zones, similarity (distance) of class characteristics of sample classes to zone characteristics of zones of other venues in a venue group, natural compliments of zones and/or tags, among other strategies for association of sample classes with zones. Such strategies for association are discussed in more detail below.

As mentioned above, a zone's characteristics are based on the sample classes 240 associated with it. Further, zone characteristics may also be based on derived characteristics (i.e. statistics) of the sample classes associated with it, known attributes of the venue and statistics of these attributes (e.g., spatial size or time ranges defining open and close times of a venue), known relationships related to the zone and other zones (e.g., if there is a zone with a tag "inside" it can be inferred there is a complement, a zone with a tag "not-inside" or "outside"), known relationships related to tags associated with the zone and other zones (e.g., semantics of tags including compliment or "not" tags), prior knowledge of characteristics based on intention, behavior, utility or semantic functionality associated with the zone (e.g., since it is known people typically drive to parking lots and then walk from their car, a transition from driving to walking motion may be considered indicative of a zone with a tag "parking").

Figure 6:
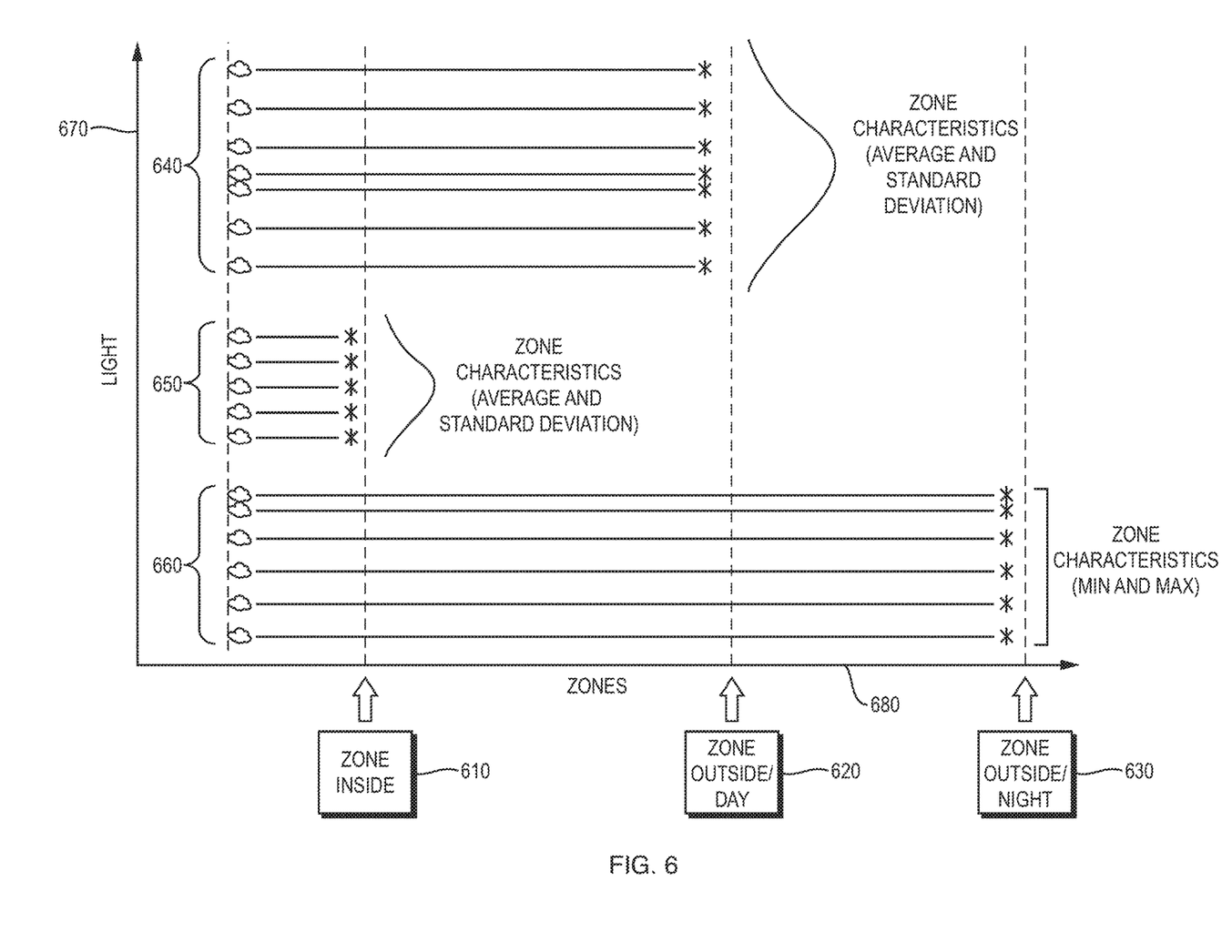
FIG. 6 is a graph illustrating an example technique for characterization of zones based on associated sample classes.

FIG. 6 is a graph 600 illustrating an example technique for characterization of zones 610-630 based on associated sample classes 640-660. Samples, and sample classes thereof, are organized in the graph based on sensor information that indicates light level along a first axis 670. Zones 610-630, including a zone 610 with a tag "inside", a zone 620 with a tag "outside/day", and a zone 630 with a tag "outside/night", are organized along a second axis 680. Zone characteristics, in this example, are based on statistics of the sample class, including average and standard deviation and minimums and maximums. It should be understood that a wide variety of other statistical measures may be used in zone characteristics.

The number of zones 250 of a venue 260 may be informed by the number of sample classes 240. Since sample classes are dynamically organized over time, sample characteristics are dynamically updated over time, and associations of sample classes with zones are dynamic in time, as more samples are collected over time, the number of zones, zone characteristics, and tags may by dynamically changed (e.g., increased).

Zones 250 may be determined based on a number of techniques. In some cases, zones may be determined based solely on groupings of sample classes 240 with similar characteristics associated with a venue, a venue group to which the venue belongs, or all venues. In this manner, a zone may be inferred and created based solely on groupings of sample classes. Such a zone may have a tag informed based on labels of samples 210 of an associated sample class, or labels of samples of zones across a venue group to which the venue belongs, or all venues. The tag for a zone determined based on sample classes may be inferred based on intention, behavior, utility or semantic functionality of samples of the sample classes associated with the venue, a venue group to which the venue belongs or all venues, or may be inferred by a human or external knowledge source.

In other cases, zones 250 may be determined before formation of, or association with, sample classes 240. Such zones may include zones generated based on external knowledge sources and zones generated based on natural complements known to exist in the environment. For example, an inside zone and an outside zone naturally exist for any space and/or time region and have a clear complementary relationship. They naturally induce an axis where sample classes are either closer to being inside or outside. Such zones generated based on external knowledge sources or natural compliments may be determined for venues regardless of associations with sample classes.

As mentioned above, since a venue 260 is characterized by a set of zones 250 and associated tags 255 and zones are based on associated sample classes 240 and their samples 210, venues are thereby characterized based on samples. Samples of a venue may include labels 230 or not. Samples of a venue may be generally classified together, or samples of a venue group may be classified together simply for purposes of characterization. Samples of each venue, venue group, or all venues may be classified to characterize different zones. Samples may be associated with venues according to a number of different techniques, including based on the location of samples being within a boundary or predetermined distance of the venue, at least one beacon indicated in the beacon information of the sample being associated with the venue, a time of observation of the sample being proximate to (e.g., within 30 seconds of) a time of a sample that is already associated with the venue, sensor information of the sample indicating a change in environment in the vicinity of a venue, semantic information included in the sample being related to a venue (e.g., a name of an application executing on the mobile device included in the sample being related to a name of the venue), a total number of detected beacons of one or more types (e.g., as an indication of density of the environment), types of detected beacons (e.g., BLE used in certain venues), labels included in samples, the samples having beacon, sensor or other information that falls inside zone characteristics of any zone associated with the venue or a venue group to which the venue belongs, among many other potential techniques.

Venues 260 having similar venue characteristics may be dynamically grouped by the processor 160 into venue groups 270 using any of a number of venue grouping algorithms. A venue may be grouped into zero, one or more venue groups, with placement in each venue group having an associated confidence measure. When a venue is placed in multiple groups, the associated confidence measures may form a hierarchy of venue groups with more confident venue groups hierarchically above lower confidence venue groups. The venue grouping algorithms may utilize known properties of the place, such as a known chain affiliation, common ownership or common functionality (e.g., use, for instance, as a theater), spatial or temporal similarity between venues (e.g., similar time of use, for instance, late-night operation, size, neighborhood, location, such as, part of the same mall complex, etc.), similarity of physical attributes (e.g., grouping all medium-sized venues, all venues that have large parking lots, etc.), or other techniques. Further, the venue grouping algorithm may be informed by existing venue group hierarchies for venues (e.g., adding or removing groups based on properties of the hierarchy).

Figure 7:
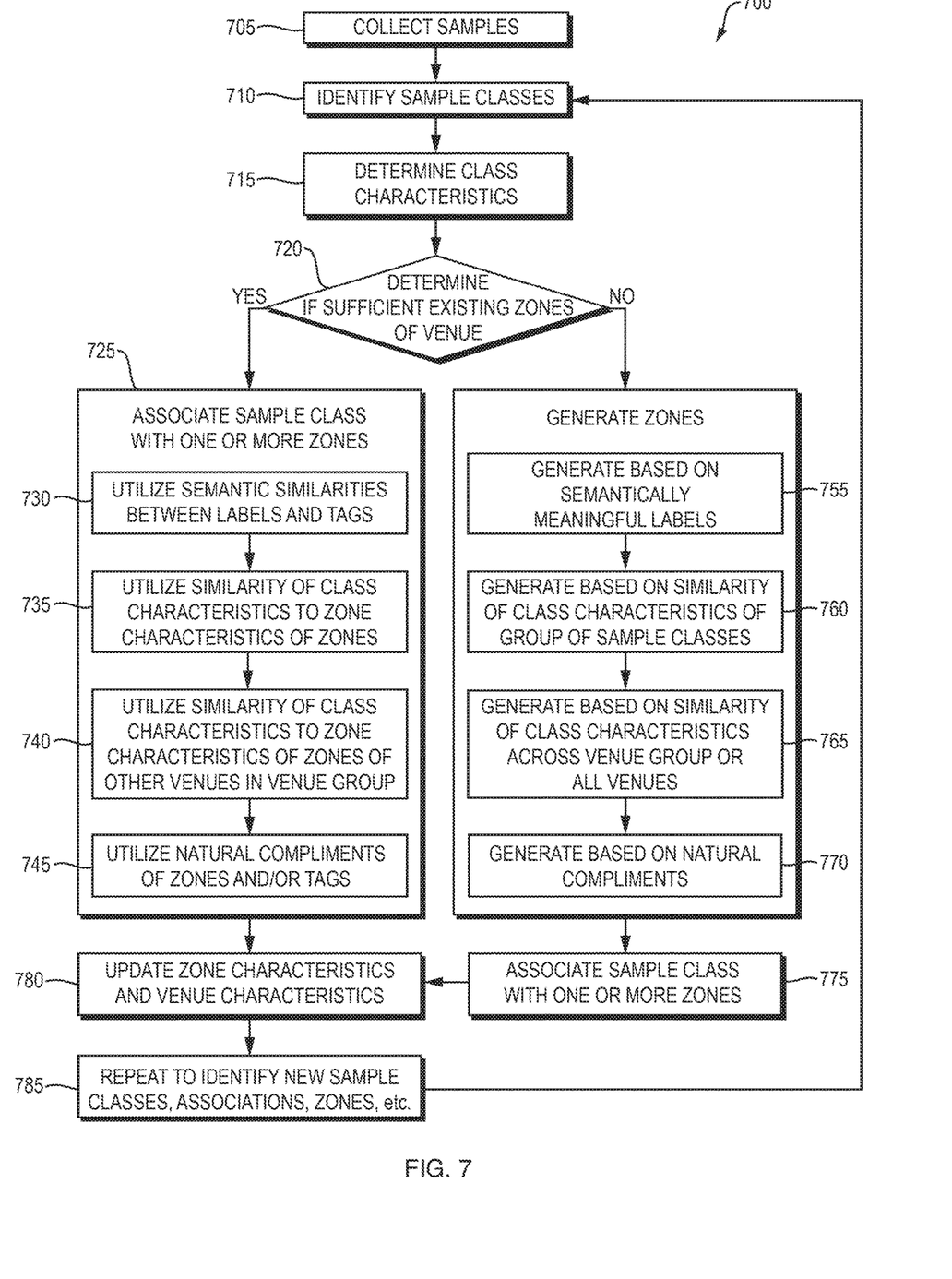
FIG. 7 is a flow diagram of an example sequence of steps that may be executed to generate and characterize zones of venues.

FIG. 7 is a flow diagram of an example sequence of steps 700 that may be executed to generate and characterize zones of venues. The steps 700 may at least partially summarize one possible implementation of the operations described above, executed by clients 115 on mobile devices 110 and a processor 160 on a server 150. It should be understood, however, that a variety of other implementation's are possible. At step 705, the clients collect samples that include beacon information and/or sensor information. At step 710, the processor 160 identifies sample classes. At step 715, the processor 160 determines class characteristics for the sample classes, for example, based on the information and/or sensor information of the class's constituent samples, derived characteristics (i.e. statistics) determined from the sample characteristics of the samples, etc. At step 720, the processor 160 determines if there are sufficient existing zones of a venue and if so, at step 725 associates each sample class with one or more zones using one or more association algorithms. At sub-step 730, the processor 160 may execute an association algorithm that utilizes semantic similarities between labels of samples of the sample classes and tags of zones. For example, sample classes with labels "cashier" and "bathrooms" may be considered semantically similar to a zone with a tag of "inside" (e.g., since being in one of the above labels of a venue implies the device is inside the venue). A confidence in the association may be based upon an absolute number of labeled samples in the sample class or based on a relative number of labeled samples in the sample class.

In addition, or alternatively, at sub-step step 735, the processor 160 may execute an association algorithm that utilizes similarity (distance) of class characteristics of sample classes to zone characteristics of zones. Certain zones may have an inherent definition in terms of class characteristics, or may impose constraints on possible class characteristics associated with it. For example, sample classes whose class characteristics pertain to a farthest possible distance from a venue may be associated with a zone having a tag "far away". Similarly, a sample class with a highest number and power of beacons (e.g., Wi-Fi APs) as its class characteristics (e.g., among all sample classes) may be associated with a zone with a tag "inside", since beacons are typically located indoors, or a sample class with class characteristics of a highest light level during nighttime may be associated with the zone having the tag "inside" since it may be indicative of being indoors where lights are on. In this manner, the characteristics of the sample classes may guide the association between the sample classes and zones.

In addition, or alternatively, at sub-step step 740, the processor 160 may execute an association algorithm that utilizes similarity (distance) of class characteristics of sample classes to zone characteristics of zones of other venues in a venue group. For example, the algorithm may look to zones of other venues in a venue group of the venue for sample characteristics similar to a given sample class's characteristics, and use such similarity to establish an association with a zone of the venue. In this manner, zones of a venue group can inform each other of potential sample class characteristics. Further, associations may be made based on relationships between zone characteristics themselves. For example, it may be known that in one venue a zone with the tag "inside" has class characteristics with higher beacon signal strength than a zone with the tag "outside". This relationship may be propagated to another venue of the venue group, and used to associate sample classes whose class characteristics indicate high beacon signal strength with a zone with the tag "inside". In general, information may be allowed to flow between zones of venues of a venue group, and sample classes associated with them.

In addition, or alternatively, at sub-step step 745, the processor 160 may execute an association algorithm that utilizes natural compliments of zones and/or tags. Such natural compliments may define an axis on which sample classes can be ordered, to be closer or further away from various zones. For example, venues will often have a zone with a tag "inside" and a zone with a tag "not-inside" that are natural complements of each other, and each sample class may be determined to be more likely to be associated with either one or the other if disposed upon an axis.

At step 750, if there are not sufficient existing zones for the venue the processor 160 generates zones using one or more zone generation algorithms. The zone generation algorithms may utilize strategies similar to the association algorithms for associating sample classes with zones. At sub-step 755, the processor 160 may execute a zone generation algorithm that generates zones based on semantically meaningful labels of samples in sample classes. Such labels in samples can inform the creation of a zone and tag, which later will be associated with the sample class. In addition, or alternatively, at sub-step 760, the processor 160 may execute a zone generation algorithm that generates zones based on similarly of class characteristics of a group of sample classes. In addition, or alternatively, at sub-step 765, the processor 160 may execute a zone generation algorithm that generates zones based on similarity of class characteristics across venue groups or all venues. This allows generation of zones that have characteristics defined by an entire venue group or all venues. In addition, or alternatively, at sub-step 770, the processor 160 may execute a zone generation algorithm that generates zones based on default zones for natural compliments that exist for the venue (e.g., an inside and not-inside or outside zone). At step 775, now that sufficient zones have been generated, the processor 160 associates each sample class with one or more zones, similar to as discussed above in step 725.

At step 780, zone characteristics and venue characterizations may be updated based on the newly associated sample classes, which may lead to identification of new sample classes, association of sample classes with different zones, determinations of different zones and other refinements. Then, at step 785, execution loops back to step 710 where additional samples are collected and the sequence of steps repeats. In this manner, a closed feedback loop is established. As more samples are collected, improved sample classes may be identified, improved associations of sample classes may be made, additional or different zones may be generated, improved zone characterizations made, the number, membership and hierarchy of venue groups refined, etc.

A quality of estimate for the characterization of each venue may be calculated and serve a guide for the closed feedback loop. The quality of estimate may be based on confidence in the characterizations of zones and tags associated with a venue, the number of samples utilized, diversity of the samples utilized and other factors. The quality estimate may be used to specifically target samples to collect to improve the quality estimate for venues and venue groups. As such the processor 160 may operate to generate recommendations for targeted observations that may best improve results.

In a system with a closed feedback loop there is a danger of diverging from the optimal solution, instead of converging to the optimal solution. In order to address this potential problem, in some implementations, the sequence of steps 700 of FIG. 7 is modified to periodically or constantly assess overall quality. The assessment may include, for example, collecting samples with known labels by visiting venues and assessing classification quality thereof. Consistency may be used to calculate the quality of classification (e.g., the more consistent class characteristics are, the more reliable they may be assumed to be). Alternatively, the assessment may include measuring consistency of classification and class characteristics over time (e.g., where significant changes may be an indication of a possible problem). Still further, the assessment may include collecting new samples with a high probability of being associated with certain zones, and determining if the resulting classification thereof is as expected.

The samples 210 collected by the mobile devices 110 to characterize venues and zones thereof and build the venue database 175 are also used to determine if a mobile device is located in a zone of a venue. As such, use of the system to determine if a mobile device 110 is located in a zone of a venue also serves to improve sample classes identified, improve associations of sample classes, generate additional or different zones, improve zone characterizations, etc. and otherwise drive the closed feedback loop discussed above.

Figure 8:
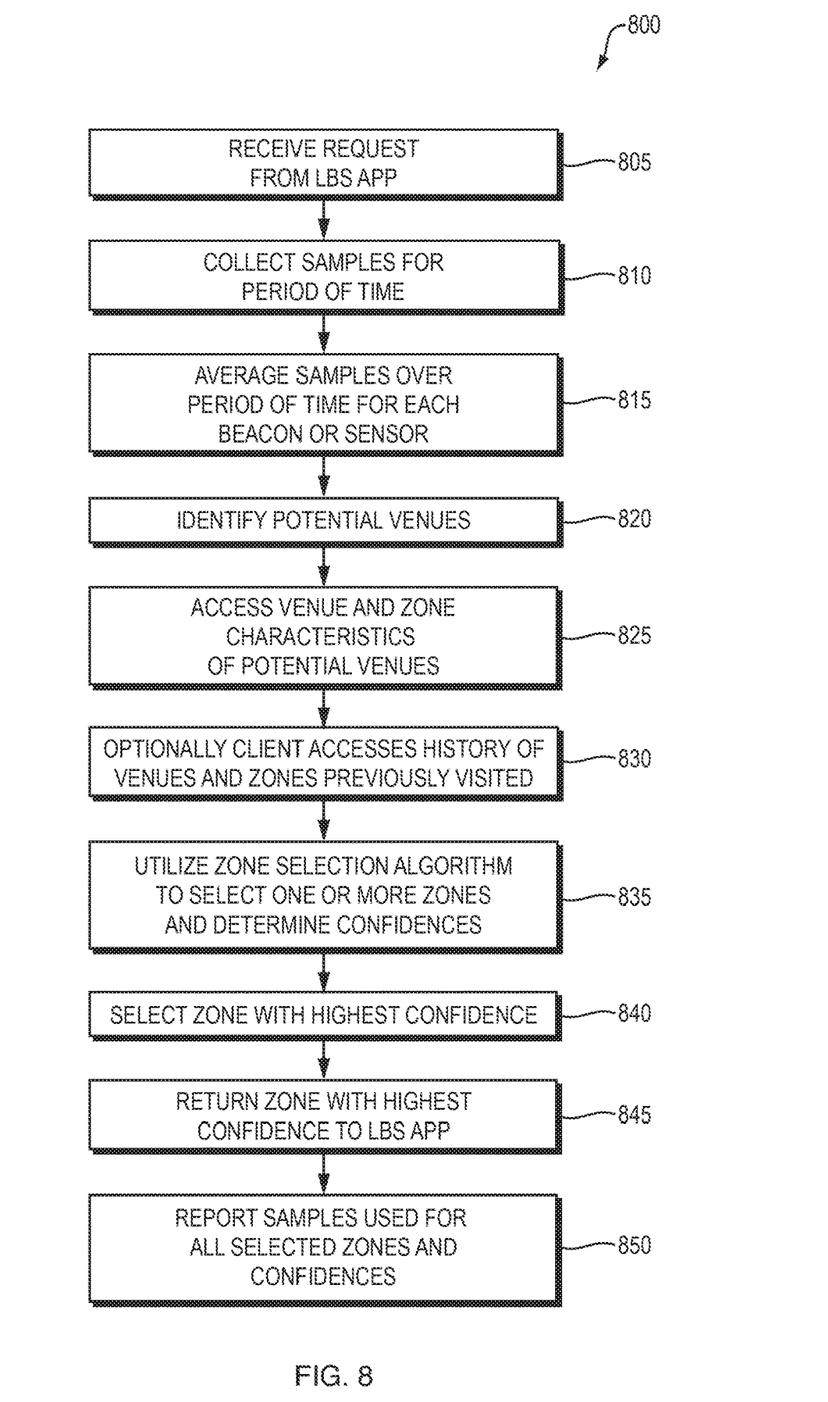
FIG. 8 is a flow diagram of an example sequence of steps 800 that may be executed to determine if a mobile device 110 is located in a zone of a venue.

FIG. 8 is a flow diagram of an example sequence of steps 800 that may be executed to determine if a mobile device 110 is located in a zone of a venue. The steps 800 may represent one possible implementation where execution largely occurs on a client 115 on the mobile device 110, and a front-end process 165 on a server 150. It should be understood that a variety of other implementation's are possible. At step 805, the client 115 receives a request from a LBS app 125 for a venue and a zone the mobile device is located in. At step 810, in response to the request, the client collects samples including at least beacon and/or sensor information for a period of time (e.g., a maximum of two minute). While in the present implementation the client 115 only acts when a request is received, in alternative implementations the client may collect samples at other times (e.g., continuously). At step 815, the client 115 averages the collected samples over the period of time for each beacon or sensor. Then, at step 820, based on the averaged samples, the client 115 identifies one or more potential venues (e.g., based on SSID of observed APs in the samples or other techniques). The identification may be performed using venue information (e.g., venue tiles) already stored (e.g., cached) on the mobile device 110, or, alternatively, by querying the front-end process 165 on the server 150 to retrieve venue information on demand from the venue database 175. At step 825, the client 115 accesses venue characteristics of the potential venues, and zone characteristics of those venue's zones, in venue information (e.g., venue tiles) already stored (e.g., cached) on the mobile device 110 or, alternatively, by querying the front-end process 165 on the serve 150 to retrieve it on demand from the venue database 175. At optional step 830, the client 115 accesses a history of venues and zones previously visited by the mobile device 110 or a history of samples previously obtained by the mobile device 110. The history may be maintained on the mobile device 110 or, alternatively, remotely on the server 150. At step 835, the client 115 utilizes a zone selection algorithm that compares measurements in the collected samples to the venue characteristics of the potential venues and zone characteristics of those venues, to select one or more zones of one or more venues and determine likelihood that the mobile device is located in the one or more selected zones.

A number of different zone selection algorithms may be utilized to determine likelihood and to select zones. For example, a zone selection algorithm may look to measurements of samples that fall within ranges defined by the venue characteristics, and select one or more zones having at least a given number of measurements that fall within the range (e.g., with a greater number of measurements that fall within the range leading to a higher likelihood). For example, in a case where a single zone is selected, the zone may have a maximum number of measurements, for example, according to:

$$N = \max\left(\sum_i (\text{if } [m_i \in (r_{min}, r_{max}), 1, 0])\right)$$

where the number of measurements $m_i$ is maximized that fall between a minimum value $r_{min}$ and maximum value $r_{max}$ of characteristics of a venue of a zone. Alternatively, a zone selection algorithm may look to a weighted sum of measurements of samples that fall within ranges defined by the venue characteristics, and select one or more zones that have at least a given weighted sum, with a greater weighted sum leading to a higher likelihood. For example, in a case where a single zone is selected, a zone of a venue having a maximum weighted sum may be selected, for example, according to:

$$N = \max(\Sigma_i W_i \times (\text{if}[m_i \in (r_{min}, r_{max}), 1, 0]))$$

where weights $W_i$ may be calculated from a known zone of a venue used as a training set (e.g., using logistics regression to predict being in the known zone or not, and using coefficients of the logistics regression as $W_i$). At least some zone selection algorithms may consider the history of venues and zones previously visited by the mobile device 110 (e.g., providing preference in selection and likelihood calculations to zones previously visited) or the history of samples previously obtained by the mobile device 110 (e.g., providing preference in selection and likelihood calculations to zones consistent with previously-obtained samples).

At step 840, the client 115 selects at least the zone of a venue with a highest likelihood. At step 845, the client 115 returns the zone of the venue with the highest likelihood to the LBS app 125. At step 850, the client 115 reports samples used for all selected zones of venues to the processor 160 for use in generating and characterizing zones of venues as described above in reference to FIG. 7. The client 115 may further report the selected zones of venues and respective likelihood, and optionally the history, for use in the above describe closed feedback loop.

In some implementations the client 115 may operate in a stand-alone mode to generate zones independent of the server 150. Such zones may be generated based on a set of predetermined rules. For example, a predetermined rule may state that if a sample indicates a payment app is active on a mobile device 110, it may be assumed that the mobile device is at zone with the tag "cashier", and such zone is automatically generated. Alternatively, a predetermined rule may state that if a sample indicates a sudden change in light level during the nighttime, zones with the tag "inside" and "outside" should be automatically generated. Zones generated in a stand-alone mode may be maintained locally at the client 115 for local use only, or sent to the server 150 for potential incorporation into the venue database 175 and used also with other mobile devices 110.

Figure 9:
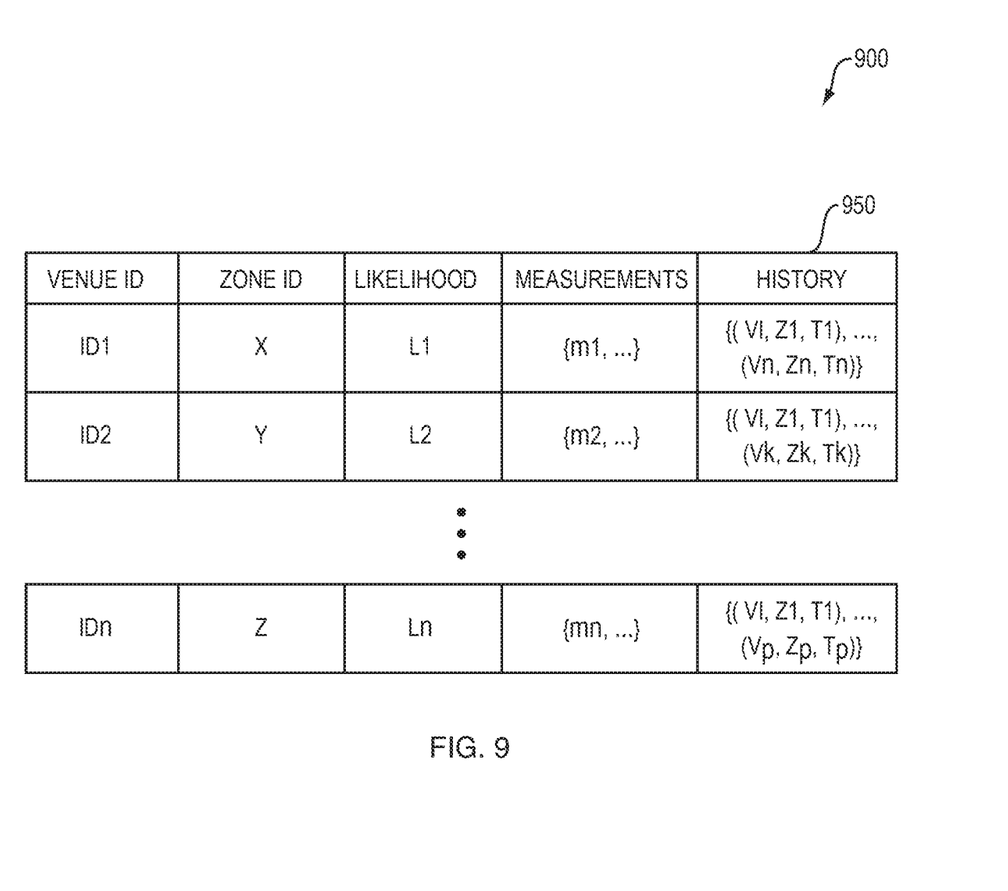
FIG. 9 is a diagram of an example client data structure that may be maintained by a client on a mobile device to store information used in, and the results of, the steps of FIG. 8.

FIG. 9 is a diagram of an example client data structure 135 that may be maintained by the client 115 on the mobile device 110 to store information used in, and the results of, the steps of FIG. 8. Each row may store a venue identifier 910 and zone identifier 920 of a selected venue and zone thereof, a likelihood measure 930 that the mobile device 110 is located in the selected venue and zone thereof, measurements from samples used in such selection 940, and, optionally, any history information 950 for the mobile device used in such selection.

In summary, the above description details techniques characterizing venues and zones thereof, and determining if a mobile device is located in a zone of a venue. It should be understood that the techniques and portions thereof may be utilized together, individually, or in combination with other techniques, depending on the implementation. Further, it should be understood that aspects of the techniques may be modified, added to, removed, or otherwise changed depending on the implementation. For example, while it is discussed above that samples include beacon and/or sensor information, it should be understood that samples may include a wide variety of other information. For example, in one alternative embodiment, samples may include user feedback information (e.g., an indication by a user that they are inside or outside of a zone or venue).

Further, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory machine-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method for determining at least one zone in which mobile devices are each presently located and identifying or updating characteristics of one or more zones maintained at a server, comprising:
   receiving, at the server, requests from the mobile devices, at least some of the requests containing samples that include beacon information and/or sensor information observed by sensors of the mobile devices;
   returning to each of the mobile devices at least one of
      characteristics of at least one zone to enable a mobile device of the mobile devices to determine the at least one zone in which the mobile device is presently located, or
      at least one determined zone; and
   identifying or updating characteristics of the one or more zones maintained at the server based on the received samples by
      identifying sample classes that each include a set of samples that share common sample characteristics,
      associating each sample class of the sample classes with zero or more zones according to one or more association algorithms;
      based on newly associated sample classes, identifying at least one new sample class, associating one or more existing sample classes with one or more different zones, or determining one or more different zones, and
      repeating the identifying or the updating the characteristics of the one or more zones in a closed feedback loop as more samples are received,
   wherein characteristics are a summary and/or derivation of a set of samples and a zone is a region of space and/or time relative to a venue, with a semantically describable identity.

2. The method of claim 1, wherein the identifying sample classes further comprises identifying groups of samples along one or more axes in space-time based on at least one of a measure of similarity between the received samples and sample characteristics, a measure of goodness of a group of the received samples to characterize a particular zone, a measure of similarity of the received samples to another sample class based on characteristics of the other sample class, or a number of sample classes determined to exist.

3. The method of claim 1, wherein the one or more association algorithms include an association algorithm that utilizes semantic similarities between labels of the received samples and tags of zones to associate each sample class with zero or more of the zones maintained at the server.

4. The method of claim 1, further comprising determining class characteristics for the sample classes, and wherein the one or more association algorithms include an association algorithm that utilizes similarity of the class characteristics of the sample classes to characteristics of one or more of the zones maintained at the server.

5. The method of claim 1, further comprising determining class characteristics for the sample classes, wherein the one or more association algorithms include an association algorithm that utilizes similarity of the class characteristics of the sample classes to characteristics of zones of other venues in a venue group.

6. The method of claim 1, wherein the one or more association algorithms include an association algorithm that utilizes natural compliments of zones and/or tags.

7. The method of claim 1, further comprising:
generating one or more new zones using one or more zone generation algorithms, the zone generation algorithms including at a zone generation algorithm that generates zones based on semantically meaningful labels of samples in sample classes, generates zones based on similarity of class characteristics of a group of sample classes, generates zones based on similarity of class characteristics across venue groups or all venues, or generates zones based on natural compliments.

8. The method of claim 1, wherein the identifying or the updating the characteristics of the one or more zones is driven by a calculated quality of estimate that is based on at least one of confidences used in characterizations of zones and tags, a number of samples used in the characterization of zones and tags, or diversity of samples utilized in the characterization of zones and tags.

9. The method of claim 1, wherein the returned characteristics of at least one zone are part of one or more tiles.

10. A method for determining at least one zone in which a mobile device is presently located, comprising:
receiving a request, from an application on the mobile device;
collecting samples including at least beacon and/or sensor information observed by one or more sensors of the mobile device;
accessing characteristics of one or more potential zones that the mobile device may be located in;
comparing, by a zone selection algorithm executing on the mobile device or a server, measurements in the collected samples to the characteristics of the one or more potential zones to select one or more of the one or more potential zones and determine a likelihood that the mobile device is located in each selected zone; and
returning, to the application, at least one zone of the one or more selected zones based on the likelihood,
wherein characteristics are a summary and/or derivation of a set of samples and a zone is a region of space and/or time relative to a venue, with a semantically describable identity.

11. The method of claim 10, wherein the characteristics of the one or more potential zones are maintained as part of venue information for venues, and the method further comprises:
identifying one or more potential venues;
accessing the characteristics of the one or more potential zones from the venue information of the one or more potential venues; and
the comparing further comprises, comparing the measurements in the collected samples to venue characteristics of the one or more potential venues as part of selecting the one or more selected zones and determining the likelihood that the mobile device is located in each selected zone.

12. The method of claim 11, wherein the zone selection algorithm operates to examine one or more of the potential zones that fall within ranges defined by venue characteristics, and select one or more of the potential zones having at least a given number of measurements that fall within the range.

13. The method of claim 11, wherein the zone selection algorithm operates to examine a weighted sum of measurements of samples that fall within ranges defined by venue characteristics and select one or more of the potential zones having at least a given weighted sum.

14. The method of claim 11, wherein the zone selection algorithm considers a history of venues and zones previously visited by the mobile device and provides preferences in selection and likelihood calculations to zones previously visited, or considers a history of samples previously obtained by the mobile device and provides preferences in selection and likelihood calculations based on the previously-obtained samples.

15. The method of claim 10, wherein at least the accessing comprises querying on demand a remote server that maintains a database storing the characteristics of the one or more potential zones.

16. The method of claim 10, wherein at least the accessing comprises utilizing a tile cached on the mobile device.

17. The method of claim 10, further comprising:
reporting the collected samples used for the one or more selected zones to a server that identifies or updates characteristics of the one or more selected zones by aggregating samples including at least beacon and/or sensor information from mobile devices.

18. The method of claim 17, further comprising:
using the reported samples at the server as part of a closed feedback loop that identifies sample classes that each include a set of samples that share common sample characteristics, determines zones and associates each sample class with zero or more zones, updates characteristics of one or more of the one or more potential zones based on newly associated sample classes, and repeats the identification, determination, and update.

19. A system for determining at least one zone in which mobile devices are each presently located and identifying or updating characteristics of one or more zones, comprising:
a server including at least:
a raw sample database that stores samples that include beacon information and/or sensor information observed by sensors of the mobile devices;
a database that stores at least characteristics of zones;
a processor configured to identify or update the characteristics of the one or more zones based on samples by identifying sample classes that each include a set of samples that share common sample characteristics, associating each sample class with zero or more zones, and based on newly associated sample classes, identifying at least one new sample class, associating one or more existing sample classes with one or more different zones, or determining one or more different zones, and repeating the identifying or the updating the characteristics of the one or more zones in a closed feedback loop as more samples are received; and
a front end process configured to receive requests from the mobile devices, and in response to each request, return characteristics of at least one zone to enable a respective mobile device to determine the at least one zone in which the mobile device is presently located or to return the at least one determined zone to the mobile device, wherein characteristics are a summary and/or derivation of a set of samples and a zone is a region of space and/or time relative to a venue, with a semantically describable identity.

20. The system of claim 19, wherein the processor is further configured to:

generate one or more new zones using one or more zone generation algorithms, the zone generation algorithms including a zone generation algorithm that generates zones based on semantically meaningful labels of samples in sample classes, generates zones based on similarity of class characteristics of a group of sample classes, generates zones based on similarity of class characteristics across venue group or all venues, or generates zones based on natural compliments.

21. The system of claim 20, wherein the system further comprises:

a mobile device of the mobile devices including at least: one or more sensors; and a client configured to receive a request from an application, collect samples including at least beacon and/or sensor information observed by the one or more by sensors, access characteristics of one or more zones that the mobile device may be located in, compare measurements in the collected samples to the characteristics of the one or more zones to select the at least one zone and determine a likelihood that the mobile device is located therein, and return to the application the at least one zone based on the likelihood.

22. The system of claim 21, wherein the client is further configured to report samples used for the one or more selected zones to the server for use in the identifying or the updating the characteristics of the one or more zones.

* * * * *

UNITED STATES PATENT AND TRADEMARK OFFICE
CERTIFICATE OF CORRECTION

PATENT NO. : 10,681,511 B1  
APPLICATION NO. : 15/803409  
DATED : June 9, 2020  
INVENTOR(S) : Farshid Alizadeh-Shabdiz et al.

Page 1 of 1

It is certified that error appears in the above-identified patent and that said Letters Patent is hereby corrected as shown below:

In the Specification

Column 6, Line 61 reads:
"based on characteristics of the other sample class (refereed"
Should read:
--based on characteristics of the other sample class (referred--

Column 9, Line 57 reads:
"however, that a variety of other implementation's are pos-"
Should read:
--however, that a variety of other implementations are pos- --

Column 12, Line 11 reads:
"understood that a variety of other implementation's are"
Should read:
--understood that a variety of other implementations are--

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*